United States Patent
Martinez (10) Patent No.: US 8,360,732 B2
(45) Date of Patent: Jan. 29, 2013

(54) ROTOR BLADE SECTION AND METHOD FOR ASSEMBLING A ROTOR BLADE FOR A WIND TURBINE

(75) Inventor: Alfredo Porfirio Amador Martinez, Queretaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/115,604

(22) Filed: May 25, 2011

(65) Prior Publication Data

US 2012/0027608 A1 Feb. 2, 2012

(51) Int. Cl.
*F03D 1/06* (2006.01)
*F03D 11/00* (2006.01)

(52) U.S. Cl. ........ 416/224; 415/226; 415/230; 415/233; 29/889.71; 29/889.72

(58) Field of Classification Search ............... 416/224, 416/225, 226, 229 R, 230, 232, 233, 241 A; 29/889.7, 889.71, 889.72; 244/17.11, 17.13, 244/17.25

See application file for complete search history.

(56) References Cited

U.S. PATENT DOCUMENTS

| | | | | |
|---|---|---|---|---|
| 2,136,265 A | * | 11/1938 | Petty | 244/119 |
| 2,254,821 A | * | 9/1941 | Haw | 416/225 |
| 2,469,480 A | * | 5/1949 | Sikorsky | 416/233 |
| 3,273,833 A | * | 9/1966 | Windecker | 416/223 R |
| 3,396,922 A | * | 8/1968 | Windecker | 416/230 |
| 3,400,904 A | * | 9/1968 | Bede | 416/226 |
| 3,416,756 A | * | 12/1968 | Windecker | 416/230 |
| 4,643,646 A | * | 2/1987 | Hahn et al. | 416/226 |
| 4,739,954 A | * | 4/1988 | Hamilton | 416/226 |
| 6,146,097 A | * | 11/2000 | Bradt | 416/226 |
| 7,517,198 B2 | | 4/2009 | Baker et al. | |
| 7,798,780 B2 | | 9/2010 | Bakhuis et al. | |
| 2007/0243387 A1 | | 10/2007 | Lin et al. | |
| 2007/0253824 A1 | | 11/2007 | Eyb | |
| 2010/0143143 A1 | | 6/2010 | Judge | |

OTHER PUBLICATIONS

Pramod Jain, Ph.D., Wind Energy Engineering (WE Handbook-3-Structural Design).

* cited by examiner

*Primary Examiner* — Christopher Verdier
(74) *Attorney, Agent, or Firm* — Dority & Manning, P.A.

(57) ABSTRACT

A rotor blade section and a method for assembling a rotor blade for a wind turbine are disclosed. The rotor blade section includes a plurality of ribs each extending in a generally chord-wise direction. Each of the plurality of ribs includes an outer surface. The outer surface has a generally aerodynamic contour. The rotor blade section further includes at least one cross-member extending between adjacent ribs of the plurality of ribs, and an outer body mounted to the plurality of ribs. The outer body has an aerodynamic contour generally corresponding to the aerodynamic contour of the plurality of ribs.

20 Claims, 6 Drawing Sheets

ROTOR BLADE SECTION AND METHOD FOR ASSEMBLING A ROTOR BLADE FOR A WIND TURBINE

FIELD OF THE INVENTION

The present disclosure relates in general to rotor blades for wind turbines, and more particularly to rotor blade sections and methods for assembling rotor blades for wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components, span-wise extending spar caps, and one or more shear webs. The skin, typically manufactured from layers of fiber composite and a lightweight core material, forms the exterior aerodynamic foil shape of the rotor blade. The spar caps provide increased rotor blade strength by integrating one or more structural elements running along the span of the rotor blade on both interior sides of the rotor blade. Shear webs are structural beam-like components running essentially perpendicular between the top and bottom spar caps and extending across the interior portion of the rotor blade between the outer skins.

The size, shape, and weight of rotor blades are factors that contribute to energy efficiencies of wind turbines. An increase in rotor blade size increases the energy production of a wind turbine, while a decrease in weight furthers the efficiency of a wind turbine. Furthermore, as rotor blade sizes grow, extra attention needs to be given to the structural integrity of the rotor blades. Presently, large commercial wind turbines in existence and in development are capable of generating from about 1.5 to about 12.5 megawatts of power. These larger wind turbines may have rotor blade assemblies larger than 90 meters in diameter. Additionally, advances in rotor blade shape encourage the manufacture of a forward swept-shaped rotor blade having a general arcuate contour from the base to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

As the size of wind turbines increases, particularly the size of the rotor blades, so do the respective costs of manufacturing, transporting, and assembly of the wind turbines. The economic benefits of increased wind turbine sizes must be weighed against these factors. For example, the costs of pre-forming, transporting, and erecting a wind turbine having rotor blades in the range of 90 meters may significantly impact the economic advantage of a larger wind turbine.

One known strategy for reducing the costs of pre-forming, transporting, and erecting wind turbines having rotor blades of increasing sizes is to manufacture the rotor blades in blade sections. Each blade section may include a portion of the span-wise extending spar caps and shear webs, or each blade section may be assembled onto large spar caps that extend the full span of the rotor blade. After the individual blade sections are transported to the erection destination, the blade sections are assembled. However, manufacture of current blade sections is difficult. For example, current manufacturing and assembly techniques have encountered problems with bonding line control, edge contour control, reparability of the various blade sections, weight reduction, and the handling of larger components, such as span-wise extending spar caps.

Thus, an improved rotor blade section and method for assembling a rotor blade for a wind turbine would be desired in the art. For example, a rotor blade section and method that facilitate the control of various design characteristics of the rotor blade by providing various independent, manageable components for each rotor blade section would be advantageous. Further a rotor blade section and method that facilitate easier transportation and assembly of the rotor blade sections and rotor blade would be desired.

BRIEF DESCRIPTION OF THE INVENTION

Aspects and advantages of the invention will be set forth in part in the following description, or may be obvious from the description, or may be learned through practice of the invention.

In one embodiment, a rotor blade section for a rotor blade of a wind turbine is disclosed. The rotor blade section includes a plurality of ribs each extending in a generally chord-wise direction. Each of the plurality of ribs includes an outer surface. The outer surface has a generally aerodynamic contour. The rotor blade section further includes at least one cross-member extending between adjacent ribs of the plurality of ribs, and an outer body mounted to the plurality of ribs. The outer body has an aerodynamic contour generally corresponding to the aerodynamic contour of the plurality of ribs.

In another embodiment, a method for assembling a rotor blade for a wind turbine is disclosed. The method includes assembling a plurality of ribs, at least one cross-sectional member, and an outer body into at least one rotor blade section. The at least one rotor blade section is configured for assembly into a rotor blade.

In another embodiment, a method for assembling a rotor blade for a wind turbine is disclosed. The method includes transporting a plurality of separate rotor blade sections to a wind turbine destination. At least one of the rotor blade sections includes a plurality of ribs each extending in a generally chord-wise direction, each of the plurality of ribs including an outer surface, the outer surface having a generally aerodynamic contour, at least one cross-member extending between adjacent ribs of the plurality of ribs, and an outer body mounted to the plurality of ribs, the outer body having an aerodynamic contour generally corresponding to the aerodynamic contour of the plurality of ribs. The method further includes assembling the plurality of rotor blade sections into a rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
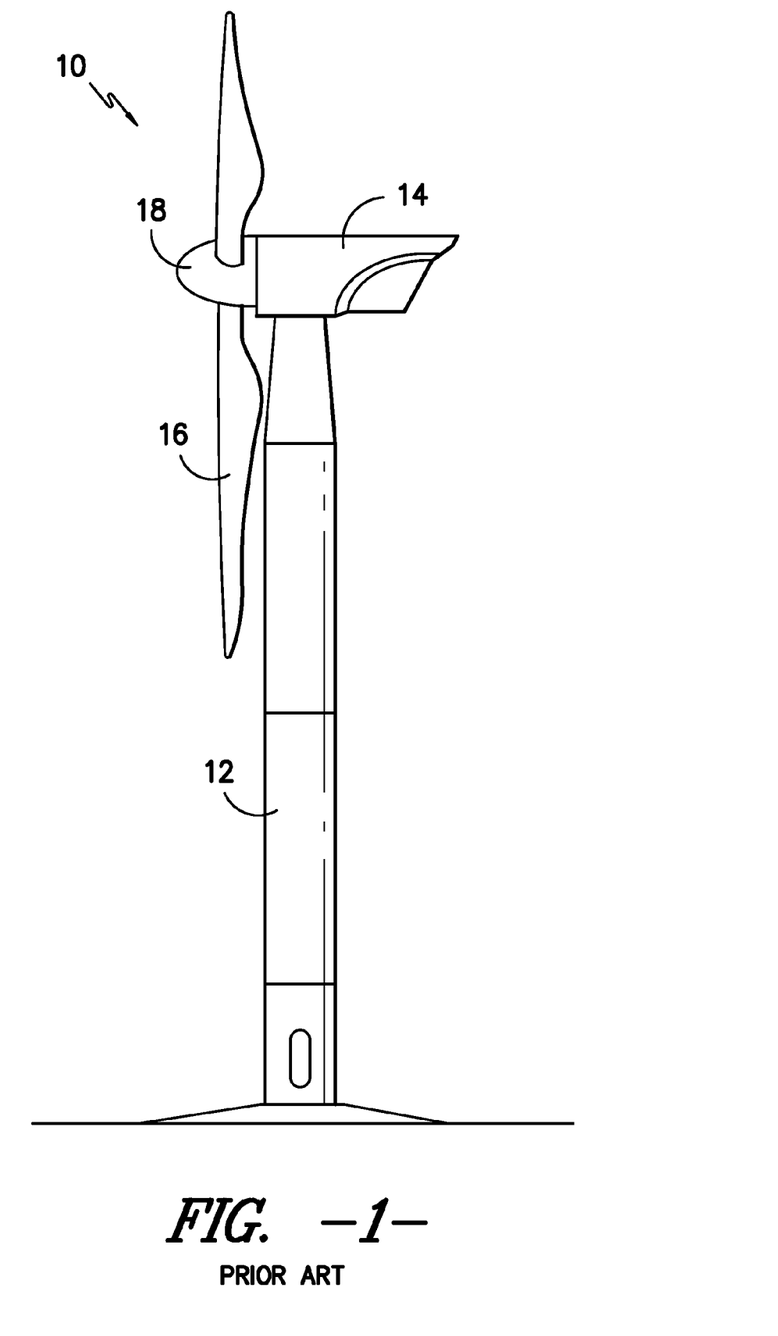
FIG. 1 is a side view of a wind turbine according to one embodiment of the present disclosure.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
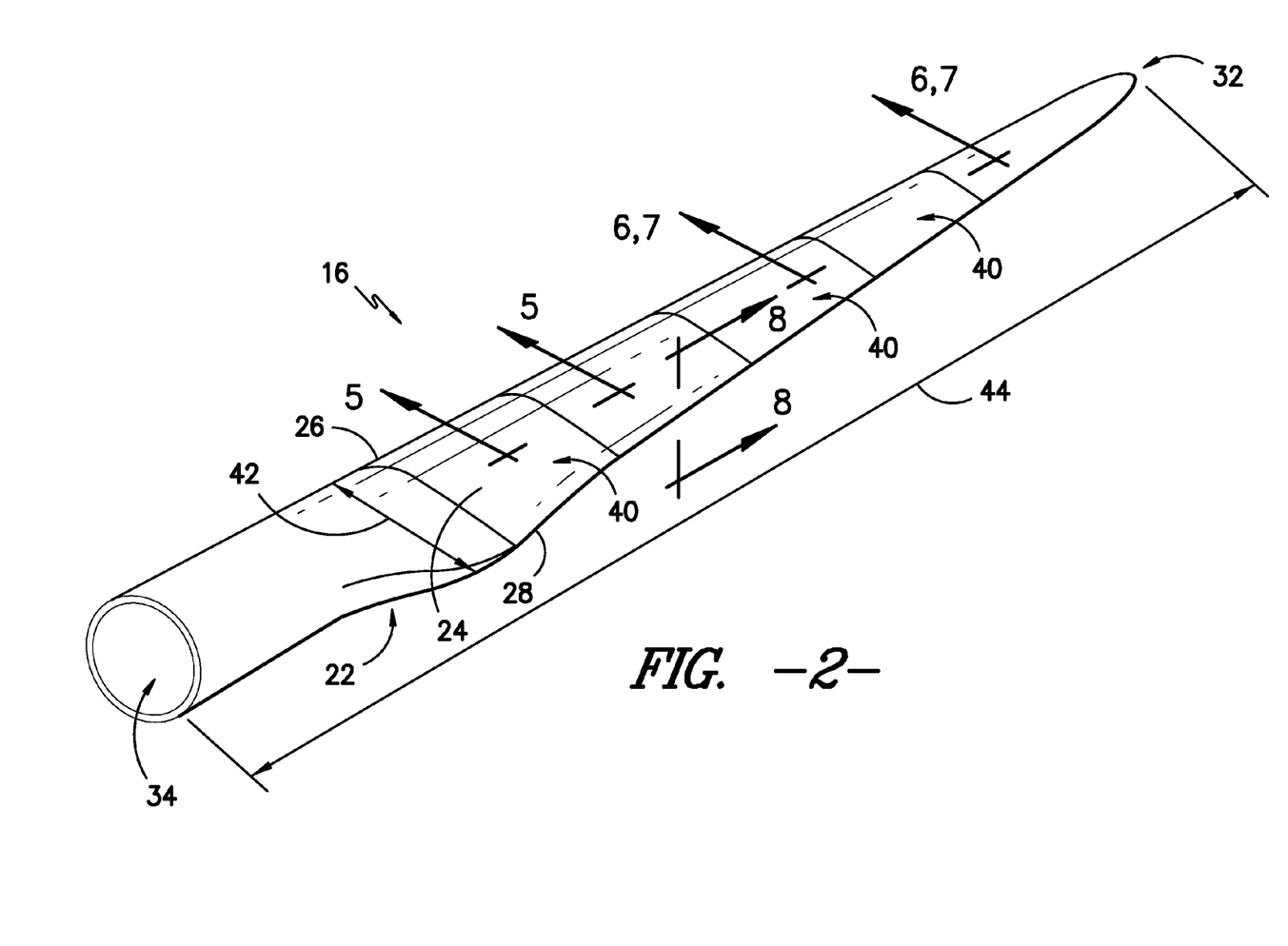
FIG. 2 is a perspective view of a rotor blade according to one embodiment of the present disclosure.
Figure 3:
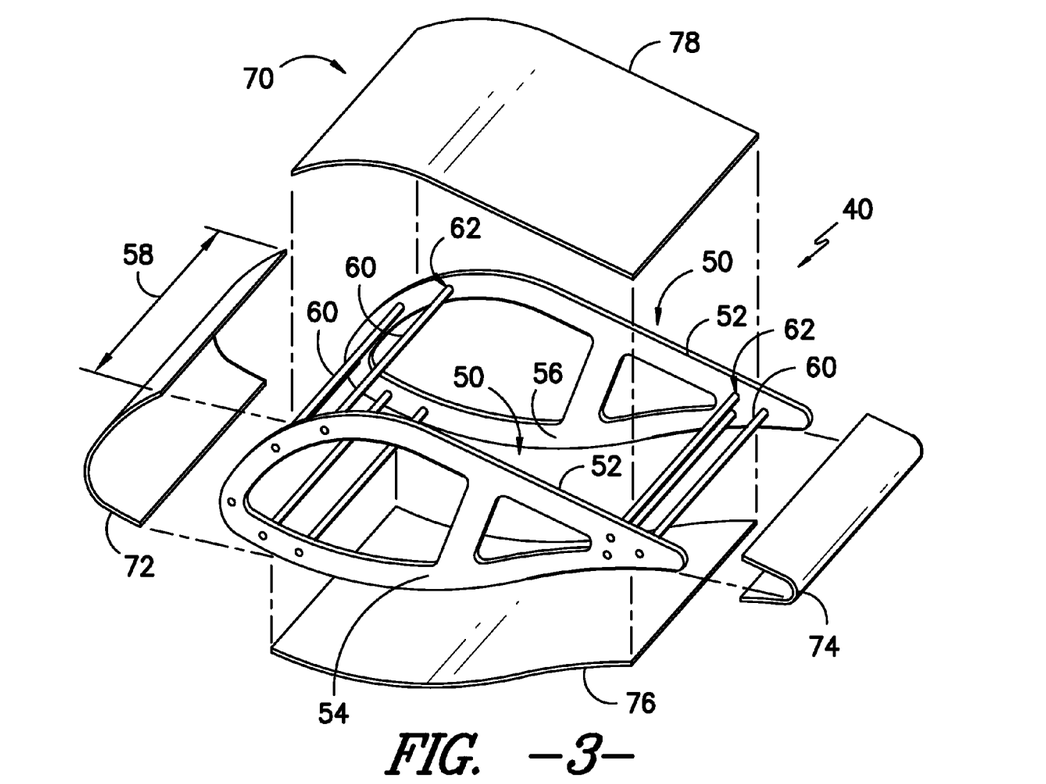
FIG. 3 is a perspective exploded view of a rotor blade section according to one embodiment of the present disclosure.
Figure 4:
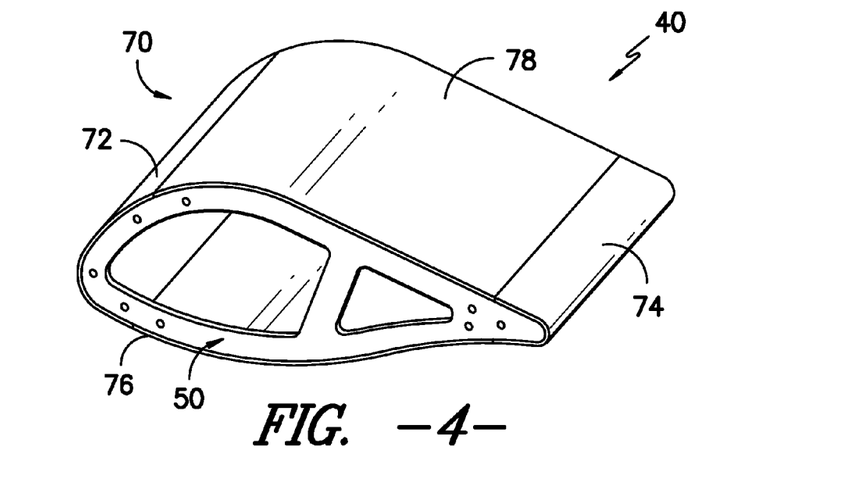
FIG. 4 is a perspective assembled view of a rotor blade section according to one embodiment of the present disclosure.

Referring to FIG. 2, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

The rotor blade 16 according to the present disclosure may include a plurality of individual rotor blade sections 40 aligned in a generally span-wise, end-to-end, order between the blade tip 32 and the blade root 34. Each of the individual rotor blade sections 40 may be uniquely configured so that the plurality of rotor blade sections 40 define a complete rotor blade 16 having a designed aerodynamic profile, length, and other desired characteristics. For example, each of the rotor blade sections 40 may have an aerodynamic profile that corresponds to the aerodynamic profile of adjacent rotor blade sections 40. Thus, the aerodynamic profiles of the rotor blade sections 40 may form a continuous aerodynamic profile of the rotor blade 16.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 42 and a span 44 extending in chord-wise and span-wise directions, respectively. As shown, the chord 42 may vary throughout the span 44 of the rotor blade 16.

FIGS. 3 through 8 illustrate various embodiments of rotor blade sections 40. One or more rotor blade sections 40 according to the present disclosure may include a plurality of ribs 50. Each rib 50 extends in a generally chord-wise direction, such that the length of the rib 50 at least partially defines the chord 42 at the location of the rib 50. Further, each rib 50 includes an outer surface 52. The outer surface 52 has a generally aerodynamic contour. The aerodynamic contour generally corresponds to the aerodynamic contour of the assembled rotor blade section 40, and thus may be, for example, generally airfoil-shaped or otherwise shaped as desired or required for a certain location on the rotor blade 16. Thus, the outer surface 52 may be continuous in the chord-wise direction to define the aerodynamic contour of the entire rotor blade section 40 at the span-wise location of the rib 50 on the rotor blade 16. Each rib may additionally include an inner surface, such that the remainder of the rib is substantially hollow. One or more rib support members may extend across the hollow inner portion of the rib, as shown.

The ribs 50 are generally chord-wise structural members which provide structural support to the rotor blade section 40 and rotor blade 16 throughout the span 44 of the rotor blade 16 or a portion thereof. Thus, at least one of the rotor blade sections 40 includes a plurality of ribs 50. The plurality of ribs 50 may include a first end rib 54 and a second end rib 56. The second end rib 56 may be spaced apart from the first end rib 54 such that the ribs 54 and 56 define the length 58, in the span-wise direction, of the rotor blade section 40. One or more ribs 50 may, if desired, be disposed between the first end rib 54 and the second end rib 56. Further, it should be understood that a rotor blade section 40 according to the present disclosure need not include a first end rib 54 and a second end rib 56 defining the length 58, and rather that any suitable arrangement of spaced apart ribs 50 is within the scope and spirit of the present disclosure.

Figure 5:
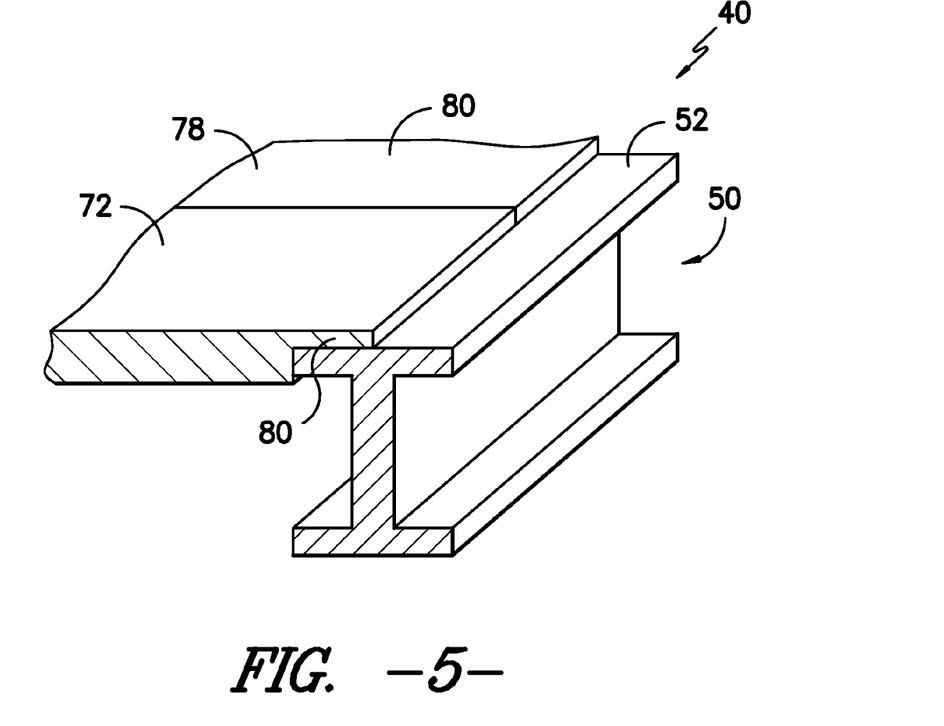
FIG. 5 is a cross-sectional view of various components of a rotor blade section, along the line 5-5 of FIG. 2, according to one embodiment of the present disclosure.

Further, one or more ribs may be included in both a rotor blade section 40 and the adjacent rotor blade section 40. For example, FIG. 5 is a cross-sectional view of a rib 50, which may be a second rib 56 of a rotor blade section 40. This second rib 56 may also serve as the first rib 54 of the adjacent rotor blade section 40 (not shown in FIG. 5). In these embodiments, the rib 50 supports various components, discussed below, of both the rotor blade section 40 and the adjacent rotor blade section 40.

Figure 6:
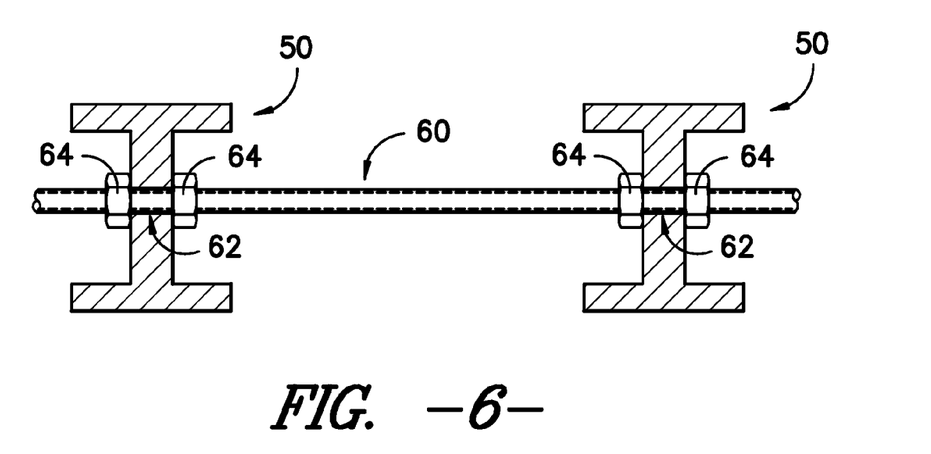
FIG. 6 is a cross-sectional view of various components of a rotor blade section, along the line 6-6 of FIG. 2, according to one embodiment of the present disclosure.
Figure 7:
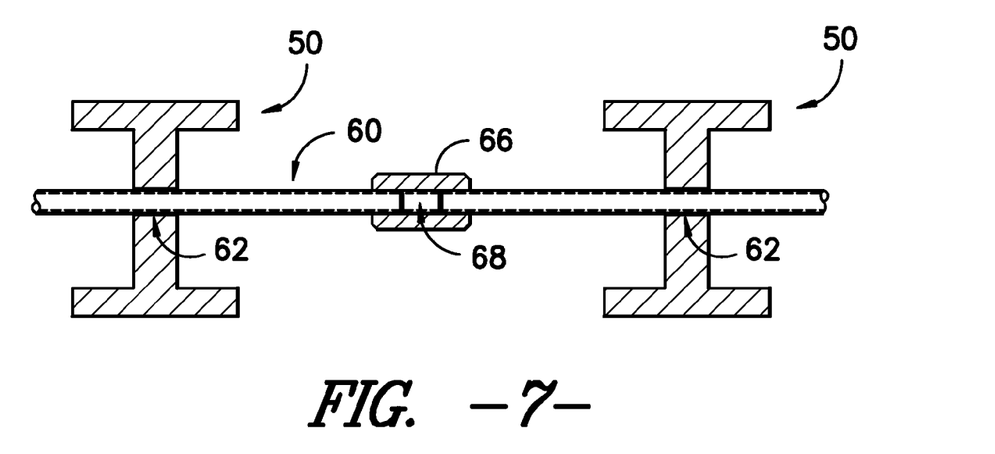
FIG. 7 is a cross-sectional view of various components of adjacent rotor blade sections, along the line 7-7 of FIG. 2, according to one embodiment of the present disclosure.

Each rib 50 may have any suitable cross-sectional profile. In some embodiments, for example, a rib 50 may have a generally I-shaped cross-sectional profile, as shown in FIGS. 5 through 7. In other words, the cross-sectional profile of the rib 50 may be that of an I-beam. In other embodiments, however, the rib 50 may be generally L-shaped, rectangular, oval, triangular, or any other suitable shape.

One or more of the rotor blade sections 40 according to the present disclosure may further include at least one cross-member 60. The cross-members 60 according to the present disclosure each extend between adjacent ribs 50 of the plurality of ribs 50. Thus, the cross-members 60 may extend in the generally span-wise direction. The cross-members 60 further provide structural support to the rotor blade section 40 and the rotor blade 16 in general.

Figure 8:
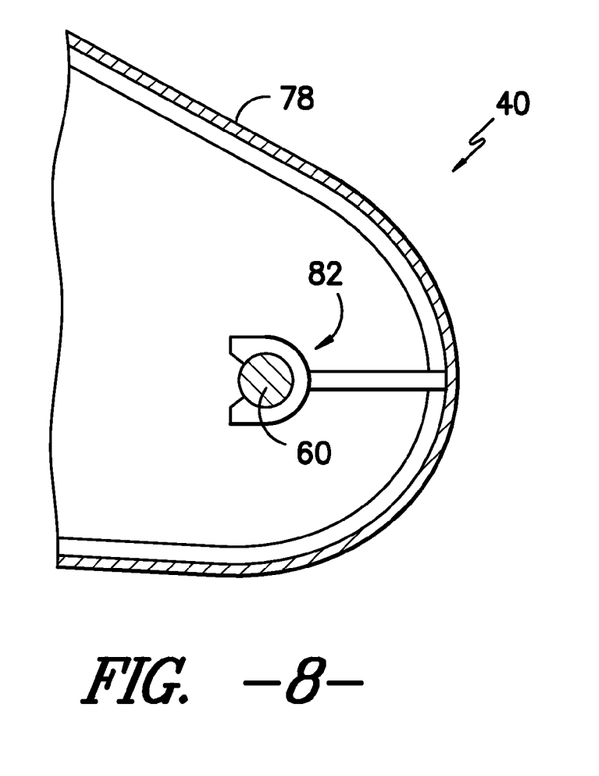
FIG. 8 is a cross-sectional view of various components of a rotor blade section, along the line 8-8 of FIG. 2, according to one embodiment of the present disclosure; and, FIG. 9 is a flow chart illustrating a method for assembling a rotor blade for a wind turbine according to one embodiment of the present disclosure.

Each cross-member 60 may have any suitable cross-sectional profile. In some embodiments, for example, a cross-member 60 may have a generally circular cross-sectional profile, as shown in FIG. 8. In other embodiments, however, the cross-member 60 may be generally rectangular, oval, triangular, or any other suitable shape.

The cross-members 60 may be located at any suitable position on the ribs 50. For example, a cross-member 60 may extend between adjacent ribs 50 and be positioned adjacent to a leading edge cap, trailing edge cap, pressure side shell, or suction side shell, as discussed below.

As discussed, a cross-member 60 may extend between adjacent ribs 50. The cross-member 60 may be mounted to each of the ribs 50 using any suitable devices or techniques. For example, the cross-members 60 may be mounted through the use of a suitable adhesive, or by welding or soldering, or by any suitable mechanical fastening technique. In one embodiment as shown in FIG. 6, each rib 50 may define a passage 62 therethrough. The passage 62 is sized and shaped to receive a cross-member 60 therethrough. The cross-member 60 may thus be received in the passage 62 and mounted therein to the rib 50. For example, in some embodiments, at least a portion of the cross-member 60 may be threaded to mate with the threads of nuts 64. The nuts 64 are fastened to the cross-member 60, such as on either side of the rib 50, to mount the cross-member 60 to the rib 50.

In some embodiments, adjacent cross-members 60, such as the adjacent cross-members 60 of adjacent rotor blade sections 40 or adjacent cross-members 60 within a single rotor blade section 40, may need to be connected during assembly of the rotor blade 16 to provide relatively continuous structural support throughout the span 44 of the rotor blade 16. The cross-members 60 may be connected to each other using any suitable devices or techniques. For example, the cross-members 60 may be connected through the use of a suitable adhesive, or by welding or soldering, or by any suitable mechanical fastening technique. In one embodiment as shown in FIG. 7, a jacket 66 may be utilized to connect adjacent cross-members 60. The jacket 66 may define a passage 68 therethrough. The passage 68 is sized and shaped to receive end portions of the adjacent cross-members 60 therein. The cross-members 60 may be connected to the jacket 66 in the passage 68, to connect the cross-members 60 together, through the use of a suitable adhesive, or by welding or soldering, or by any suitable mechanical fastening technique such as through the use of mating threads on the cross-members 60 and the jacket 66 within the passage 68.

One or more of the rotor blade sections 40 according to the present disclosure may further include an outer body 70. The outer bodies 70 of the adjacent rotor blade sections 40, when assembled, may form the outer body of the rotor blade 16. Thus, an outer body 70 has an aerodynamic contour. Further, the outer body 70 may be mounted to the plurality of ribs 50, as discussed below. Thus, the aerodynamic contour of the outer body 70 may generally correspond to the aerodynamic contour of the ribs 50.

In some embodiments, the outer body 70 may be formed from various components, while in other embodiments, the outer body 70 may be a unitary structure. In exemplary embodiments, the outer body 70 is formed from a leading edge cap 72, a trailing edge cap 74, a pressure side shell 76, and a suction side shell 78, as shown in FIGS. 3, 4, 5, and 8. The leading edge cap 72 forms a portion of the leading edge 26 of the rotor blade 16 when assembled, and may further extend partially into the pressure side 22 and/or suction side 24. The trailing edge cap 74 forms a portion of the trailing edge 28 of the rotor blade 16 when assembled, and may further extend partially into the pressure side 22 and/or suction side 24. The pressure side shell 76 and suction side shell 78 form portions of the pressure side 22 and suction side 24, respectively, of the rotor blade 16 when assembled.

As mentioned above, the outer body 70 or various components thereof may be mounted to the ribs 50. Mounting may be done using any suitable devices or techniques. For example, the outer body 70 components may be mounted through the use of a suitable adhesive, or by welding or soldering, or by any suitable mechanical fastening technique. Further, in some embodiments, one or more of the components of the outer body 70, such as the leading edge cap 72, trailing edge cap 74, pressure side shell 76, and/or suction side shell 78, may include a lap edge 80. The lap edge 80 may be a portion of an edge of the component that has a cut-out area that facilitates mounting of the component to a rib 50. For example, FIG. 5 illustrates a leading edge cap 72 and suction side shell 78, each having a lap edge 80, mounted to a rib 50. It should be noted that the lap edge 80 may be sized to cover the entire outer surface 52 of the rib 50, or only a portion of the outer surface 52 of the rib 50 as shown. For example, in the embodiment as shown in FIG. 5, the lap edges 80 cover only a portion of the outer surface 52 of the rib 50. This rib 50 is the second end rib 58 of the rotor blade section 40 as well as the first end rib 56 of an adjacent rotor blade section 40 (not shown in FIG. 5). Thus, the lap edges 80 of the adjacent outer body 70 components from the adjacent rotor blade section 40 may also be mounted to the rib 50, covering another portion of the outer surface 52 and optionally abutting against the outer body 70 components shown.

In some embodiments, one or more components of the outer body 70, such as the leading edge cap 72, trailing edge cap 74, pressure side shell 76, and/or suction side shell 78, may further be mounted to at least one cross-member 60. The components may be mounted through the use of a suitable adhesive, or by welding or soldering, or by any suitable mechanical fastening technique. Additionally or alternatively, a suitable hook, fastener, or female member may be utilized for mounting. For example, FIG. 8 illustrates one embodiment of a resilient female member 82, which may be generally U-shaped as shown or have any other suitable shape. The female member 82 may receive a cross-member 60 therein, and may be resiliently biased such that the cross-member 60 is held therein. One or more female members 82 may be connected to and extend from the leading edge cap 72, trailing edge cap 74, pressure side shell 76, and/or suction side shell 78 for mounting that component to a cross-member 60.

The various components of a rotor blade section 40 according to the present disclosure, such as the ribs 50, cross-members 60, and outer body 70 components, may be formed from any suitable materials, such as suitable light-weight structural materials. For example, in some embodiments, various components may be composites, such as fiberglass, carbon fiber, or other suitable composites. Additionally or alternatively, various components may be formed from metals or metal alloys, such as aluminum or other suitable metals or metal alloys. Further, it may be desirable for the materials to be relatively light-weight, to facilitate transportation and assembly.

Figure 9:
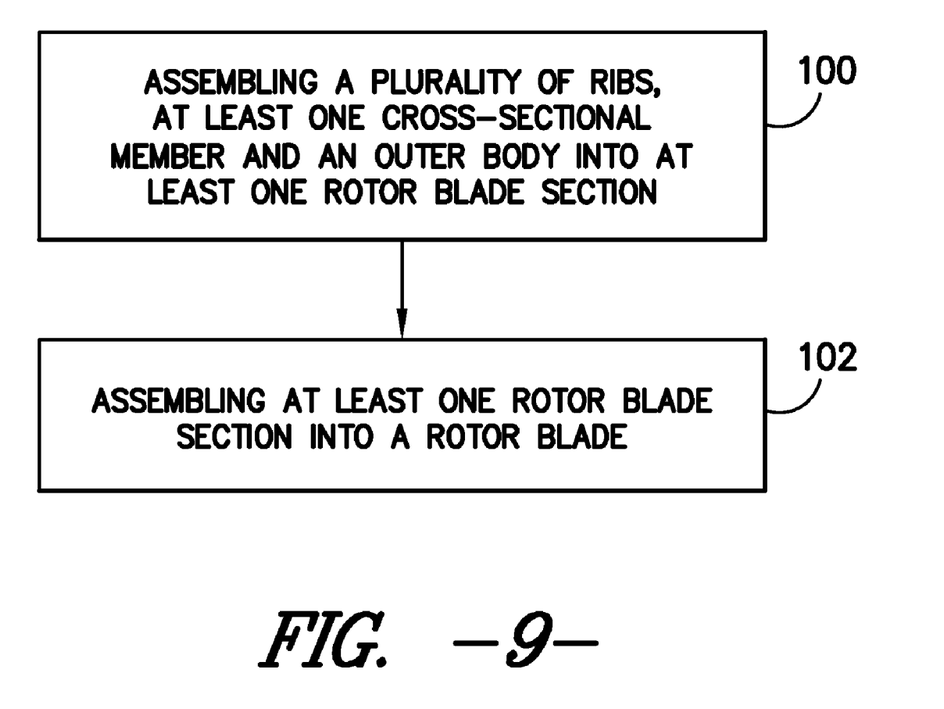

The present disclosure is further directed to a method for assembling a rotor blade 16 for a wind turbine 10. FIG. 9 illustrates various steps according to one embodiment of the present disclosure. The method may include, for example, assembling a plurality of ribs 50, at least one cross-sectional member 60, and an outer body 70 into at least one rotor blade section 40, as shown by reference numeral 100. The at least one rotor blade section 40, when assembled, may be configured for assembly into a rotor blade 16.

In some embodiments, the method may further include the step of assembling the at least one rotor blade section 40 into a rotor blade 16, as shown by reference numeral 102. The rotor blade section 40 may be assembled with similarly constructed rotor blade sections 40 or rotor blade sections 40 with alternate constructions, as desired or required.

The method may, in some embodiments, include transporting a plurality of separate rotor blade sections 40 to a wind turbine 10 destination. At least one of the rotor blade sections 40 may include a plurality of ribs 50, at least one cross-member 60, and an outer body 70, as discussed above. In some embodiments, these various components may be separate components during transportation to the wind turbine destination.

Thus, the present disclosure provides an improved rotor blade section 40 and method for assembling a rotor blade 16 for a wind turbine 10. The rotor blade section 40 and method facilitate the control of various design characteristics of the rotor blade 16 by providing various independent, manageable components for each rotor blade section 40. These components may be easily assembled before or after transportation to a wind turbine 10 destination. Thus, the rotor blade section 40 and method additionally facilitate easy transportation and assembly of the rotor blade sections 40 and rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade section for a rotor blade of a wind turbine, the rotor blade section comprising:
    a plurality of ribs each extending in a generally chord-wise direction, each of the plurality of ribs comprising an outer surface, the outer surface having a generally aerodynamic contour;
    at least one cross-member extending between adjacent ribs of the plurality of ribs, the entire at least one cross-member spaced from the outer surface of each of the plurality of ribs; and,
    an outer body directly mounted to both the plurality of ribs and the at least one cross-member, the outer body having an aerodynamic contour generally corresponding to the aerodynamic contour of the plurality of ribs.

2. The rotor blade section of claim 1, wherein the plurality of ribs comprises a first end rib and a second end rib, the second end rib spaced apart from the first end rib, the first end rib and second end rib defining a length of the rotor blade section.

3. The rotor blade section of claim 1, further comprising a plurality of cross-members.

4. The rotor blade section of claim 1, wherein each of the plurality of ribs has a generally I-shaped cross-sectional profile.

5. The rotor blade section of claim 1, wherein the adjacent ribs each define a passage therethrough for receiving the at least one cross-member, and further comprising a plurality of nuts mounting the at least one cross-member to each of the adjacent ribs.

6. The rotor blade section of claim 1, wherein the outer body comprises a leading edge cap, a trailing edge cap, a pressure side shell, and a suction side shell.

7. The rotor blade section of claim 6, further comprising a plurality of cross-members, and wherein at least one of the leading edge cap or the trailing edge cap is mounted to at least one of the plurality of cross-members.

8. The rotor blade section of claim 7, further comprising at least one resilient female member connected to the at least one of the leading edge cap or the trailing edge cap and configured for mounting the at least one of the leading edge cap or the trailing edge cap to at least one of the plurality of cross-members.

9. The rotor blade section of claim 6, wherein at least one of the leading edge cap or the trailing edge cap includes a lap edge mounting the at least one of the leading edge cap or the trailing edge cap to one of the plurality of ribs.

10. The rotor blade section of claim 6, wherein the pressure side shell and the suction side shell each include a lap edge mounting the pressure side shell and the suction side shell to one of the plurality of ribs.

11. A rotor blade for a wind turbine, the rotor blade comprising:
    a plurality of rotor blade sections aligned in a generally span-wise direction, at least one of the plurality of rotor blade sections comprising:
    a plurality of ribs each extending in a generally chord-wise direction, each of the plurality of ribs comprising an outer surface, the outer surface having an generally aerodynamic contour;
    at least one cross-member extending between adjacent ribs of the plurality of ribs, the entire at least one cross-member spaced from the outer surface of each of the plurality of ribs; and,
    an outer body directly mounted to both the plurality of ribs and the at least one cross-member, the outer body having an aerodynamic contour generally corresponding to the aerodynamic contour of the plurality of ribs.

12. The rotor blade of claim 11, wherein each of the plurality of rotor blade sections comprises a plurality of ribs, at least one cross-member, and an outer body.

13. The rotor blade of claim 12, further comprising a jacket connecting adjacent cross-members of adjacent rotor blade sections.

14. The rotor blade of claim 11, wherein the plurality of ribs comprises a first end rib and a second end rib, the second end rib spaced apart from the first end rib, the first end rib and second end rib defining a length of the rotor blade section.

15. The rotor blade of claim 14, wherein the second end rib of one of the plurality of rotor blade sections is the first end rib of an adjacent one of the plurality of rotor blade sections.

16. The rotor blade of claim 11, wherein each of the plurality of ribs has a generally I-shaped cross-sectional profile.

17. The rotor blade of claim 11, wherein the adjacent ribs each define a passage therethrough for receiving the at least one cross-member, and further comprising a plurality of nuts mounting the at least one cross-member to each of the adjacent ribs.

18. The rotor blade of claim 11, wherein the outer body comprises a leading edge cap, a trailing edge cap, a pressure side shell, and a suction side shell.

19. A method for assembling a rotor blade for a wind turbine, the method comprising:
   assembling a plurality of ribs, at least one cross-member, and an outer body into at least one rotor blade section such that the at least one cross-member extends between adjacent ribs of the plurality of ribs and the entire at least one cross-member is spaced from an outer surface of each of the plurality of ribs and such that the outer body is directly mounted to both the plurality of ribs and the at least one cross-member,
   wherein the at least one rotor blade section is configured for assembly into a rotor blade.

20. The method of claim 19, further comprising assembling the at least one rotor blade section into the rotor blade.

* * * * *